(12) United States Patent
Gangadharan et al.

(10) Patent No.: US 8,775,989 B2
(45) Date of Patent: Jul. 8, 2014

(54) COMPUTER-AIDED DESIGN SYSTEM AND METHODS THEREOF FOR MERGING DESIGN CONSTRAINT FILES ACROSS OPERATIONAL MODES

(75) Inventors: Sridhar Gangadharan, San Jose, CA (US); Manish Goel, Delhi (IN); Amit Handa, Delhi (IN)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/178,607

(22) Filed: Jul. 8, 2011

(65) Prior Publication Data

US 2013/0014068 A1 Jan. 10, 2013

(51) Int. Cl.
*G06F 17/50* (2006.01)

(52) U.S. Cl.
USPC .......................................... 716/108; 716/109

(58) Field of Classification Search
USPC ................................ 716/108–113
See application file for complete search history.

(56) References Cited

U.S. PATENT DOCUMENTS

| 6,311,317 | B1 | 10/2001 | Khoche et al. |
| 6,877,146 | B1 | 4/2005 | Teig et al. |
| 6,957,403 | B2 | 10/2005 | Wang et al. |
| 7,331,032 | B2 | 2/2008 | Wang et al. |
| 7,370,309 | B2 * | 5/2008 | Tetelbaum .................... 716/130 |
| 7,448,007 | B2 * | 11/2008 | Alpert et al. .................. 716/114 |
| 7,562,321 | B2 | 7/2009 | Wang et al. |
| 7,882,483 | B2 | 2/2011 | Gangadharan et al. |
| 7,904,857 | B2 | 3/2011 | Wang et al. |
| 7,913,208 | B2 | 3/2011 | Baumgartner et al. |
| 2008/0077900 | A1 * | 3/2008 | Oh et al. ........................ 716/11 |
| 2008/0301598 | A1 * | 12/2008 | Gangadharan et al. ........... 716/5 |
| 2009/0051698 | A1 * | 2/2009 | Boose et al. ................. 345/619 |

\* cited by examiner

*Primary Examiner* — Binh Tat
(74) *Attorney, Agent, or Firm* — Sughrue Mion, PLLC

(57) ABSTRACT

In the field of integrated circuit (IC) design it is common to use a plurality of design constraints files to provide the appropriate operational mode when checking the design. Designers typically use the Synopsis® design constraint (SDC) format to describe the constraints in each operational mode. Each time an operational mode is tested a corresponding SDC is used. By merging a plurality of SDCs into a single most pessimistic SDC, designers are able to ensure that the device will properly operate in all the defined operational modes. Only a single run of the merged SDC in the hypothetical mode is required thereby saving time as well as avoiding potential errors from conflicting constraints in different operational modes.

21 Claims, 3 Drawing Sheets

COMPUTER-AIDED DESIGN SYSTEM AND METHODS THEREOF FOR MERGING DESIGN CONSTRAINT FILES ACROSS OPERATIONAL MODES

BACKGROUND

Design constraints in general, and specifically the Synopsys® Design Constraints (SDC), is a format used to specify a timing design intent for the design. The SDC format is based on the tool command language (Tcl). The Synopsys® Design Compiler©, Integrated Circuit (IC) Compiler, Astro®, Jupiter XT™, and PrimeTime® tools, as well as third party electronic design automation (EDA) tools, all use the SDC description to synthesize and analyze the design. When a third party tool uses a SDC description it typically communicates with other tools through the SDC format as an interface, that is, it both receives a SDC format at its input and then provides an SDC format at its output.

For each functional or test mode to be modeled there is provided its respective SDC file that is used for the purpose of synthesis, static timing analysis, and implementation of the design. The designers of the design will typically attempt to optimize the design for each mode of operation despite of the conflicting requirements that may be presented by the designers. A design is considered completed once all the operation modes have been tested and validated. This is of course a time consuming and error-prone process.

There is therefore a need in the art to overcome the deficiencies of design constraint modeling in general, and in particular the use of a plurality of SDC files for such matters, and provide an alternative compatible solution that is time efficient and that provides the same level of coverage.

SUMMARY

An exemplary method for merging a plurality of design constraints files of a design of an integrated circuit (IC) designed using a computer aided design (CAD) system is provided. The method includes: receiving the plurality of design constraints files from the CAD system; merging the plurality of design constraints files into a merged design constraints file based on at least a merging rule such that the merged design constraints file contains a pessimistic constraints set for the IC; and storing the merged design constraints file in a memory of the CAD system, wherein the design of the IC can be verified using the merged design constraints file instead of the plurality of design constraints files.

A non-transitory computer readable medium having stored thereon instructions for causing one or more processing units to execute the above method is also provided.

Further, an exemplary computer aided design (CAD) system for the design of an integrated circuit (IC) is provided. The system includes a memory in which a plurality of design constraints files of the IC are stored; and a central processing unit (CPU) which executes instructions for merging the plurality of design constraints files of the IC, based on at least a merging rule, into a merged constraints file, the merged filed including a pessimistic constraints set for the IC, wherein design of the IC can be verified using the merged design constraints file instead of the plurality of design constraints files.

DETAILED DESCRIPTION

In the field of integrated circuit (IC) design it is common to use a plurality of design constraints files to provide the appropriate operational mode when checking the design. Designers typically use the Synopsys® design constraint (SDC) format to describe the constraints in each operational mode. Each time an operational mode is tested a corresponding SDC is used. By merging a plurality of SDCs into a single most pessimistic SDC designers are able to ensure that the device will properly operate in all the defined operational modes. Only a single run of the merged SDC in the hypothetical mode is required thereby saving time as well as avoiding potential errors from conflicting constraints in different operational modes.

Figure 1:
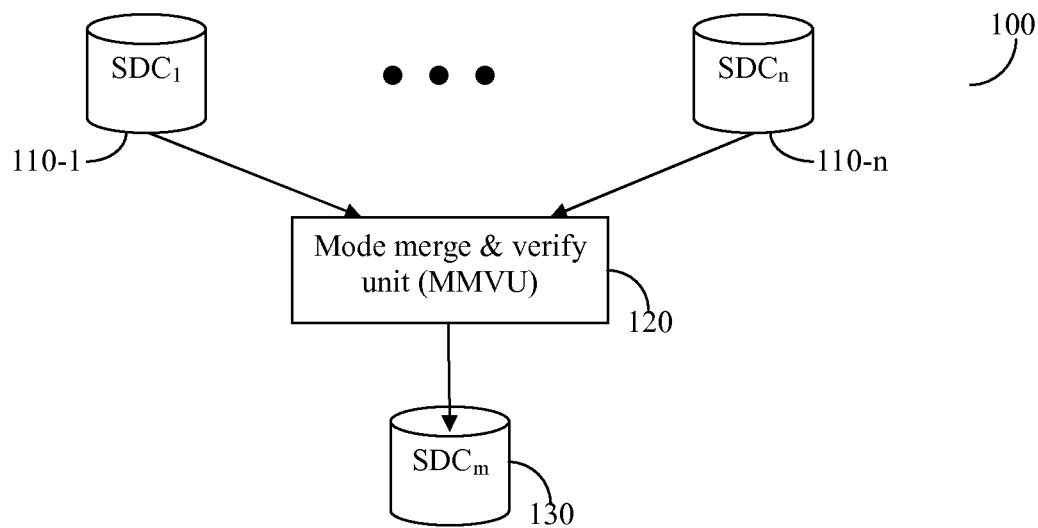
FIG. 1—is a block diagram of an exemplary system in accordance with the present disclosure FIG. 2—is an exemplary flowchart depicting the operation of the exemplary system for merging a plurality of SDCs FIG. 3—is an exemplary flowchart depicting the process of equivalency checking of a single mode SDC with a merged mode SDC in accordance with an exemplary implementation FIG. 4—is a block diagram of a first example of clocks converging on a multiplexer FIG. 5—is a block diagram of a second example of clocks converging on a multiplexer FIG. 6—is a block diagram of a third example of clocks converging on a multiplexer
Figure 2:
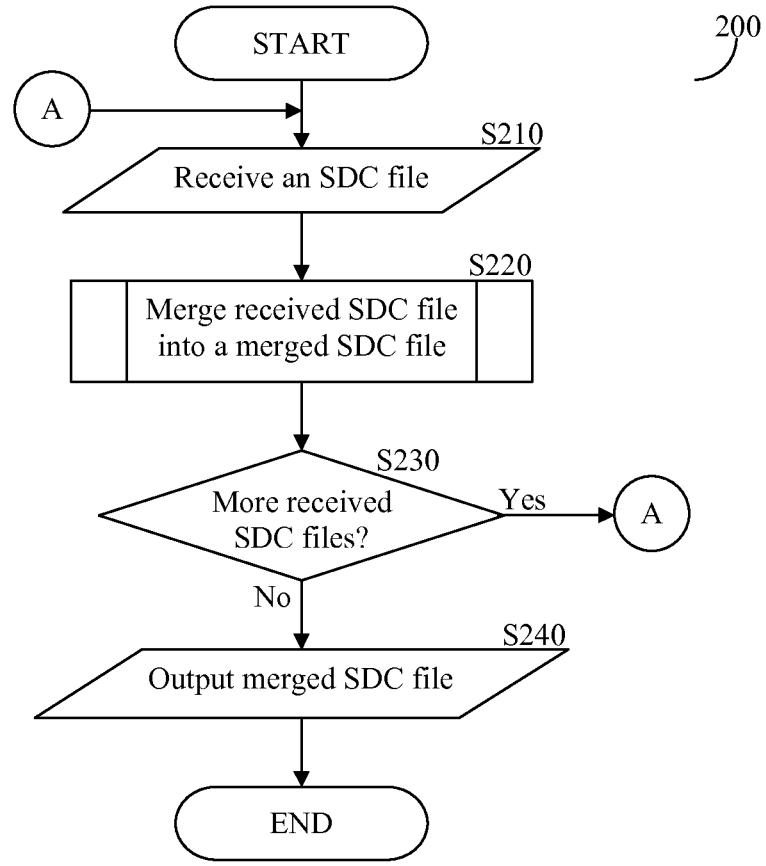

Reference is now made to FIG. 1 that depicts an exemplary and non-limiting block diagram of the system 100 implemented in accordance with the principles of the present disclosure. For a given IC design there are provided a plurality of SDC files 110-1 through 110-n, each providing constraints for a different operational mode. These SDC files 110 are provided to a SDC mode merge and verify unit (MMVU) 120, the operation of which is explained in greater detail herein below. The output of the MMVU 120 is a merged SDC file 130 that has the most pessimistic constraint such that it cannot under-constraint any path or design object any more than the individual SDC mode of any of the files 110 (corresponds to any one of the files 110-1 through 110-n). The operation of the system 100 is further explained with respect to FIG. 2 that shows an exemplary and non-limiting flowchart 200 of the operation of the system 100 for merging a plurality of SDCs 110. In S210 an SDC file is received from the plurality of SDC files 110. In S220 the received SDC file is merged with previously merged SDC files as further explained herein below. In S230 it is checked whether additional SDC files 110 are to be merged and if so execution continues with S210; otherwise, execution continues with S240. In S240 the merged SDC file that contains the consolidated SDC information that represents a hypothetical mode which covers all of the timing scenarios of the individual mode is output.

As noted above the merged constraint is pessimistic enough that it cannot under-constraint any path or design object any more than the individual SDC modes. In one exemplary implementation the process of merging may indicate what has been merged, what has been dropped, and where conflicts exist that cannot be merged.

Figure 3:
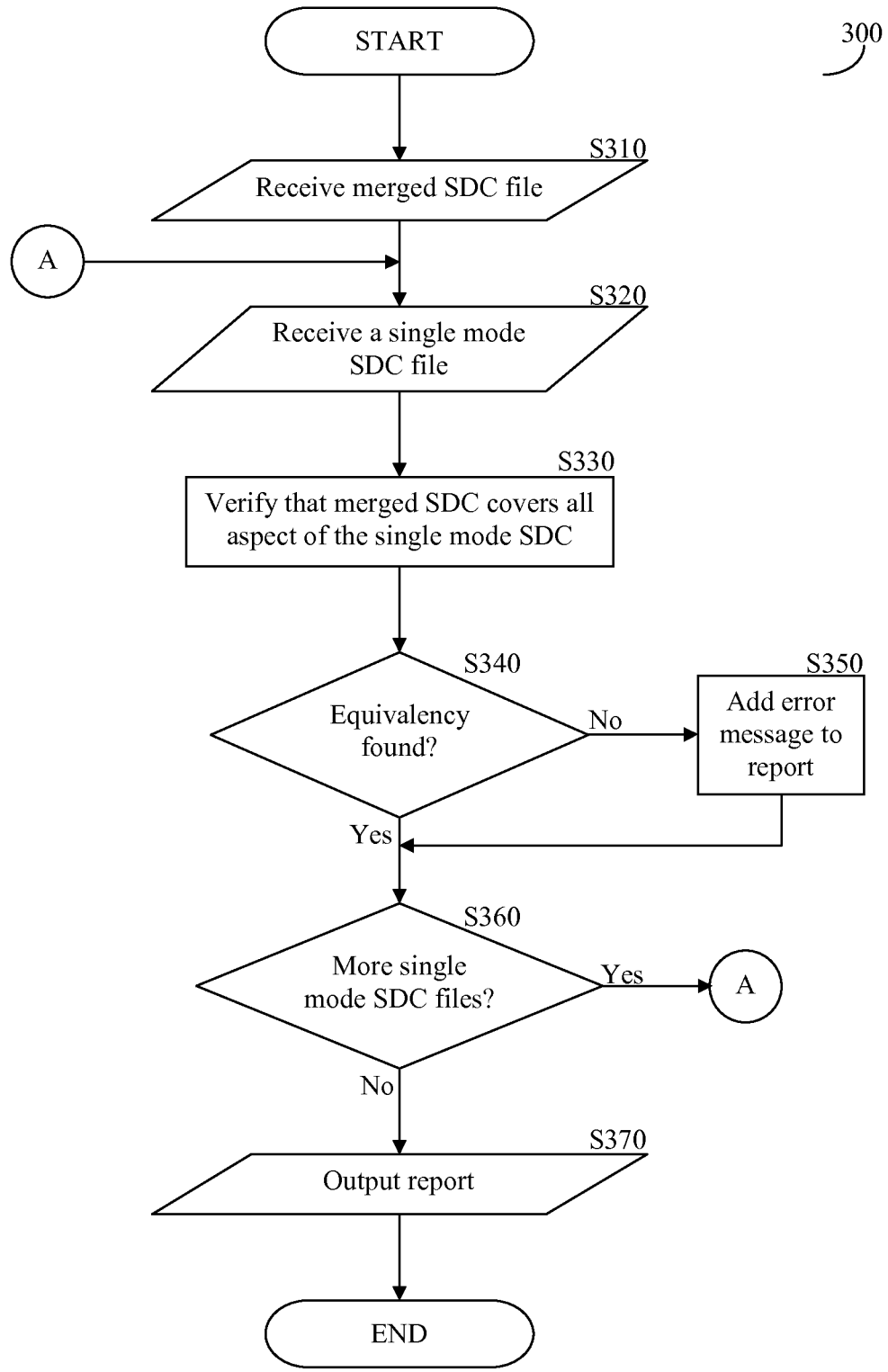

Exemplarily, once the individual SDC files 110 are merged into the merged SDC file 130, the equivalency of the SDC files may be verified. That is, it may be verified whether the constraints of an individual SDC file, for example, SDC file 110-1, are fully included in the merged SDC file 130. FIG. 3 depicts an exemplary and non-limiting flowchart 300 of the process of equivalency checking of a single mode SDC with a merged mode SDC in accordance with an exemplary implementation. In S310 the merged SDC file, for example merged SDC file 130, is received. In S320 a single mode SDC file, for example SDC 110-1, is received. In S330 it is checked that the constraints of the single mode SDC file, for example SDC 110-1, are included in the merged SDC 130 and are not under-constrained. In S340 if the verification is successful then execution continues with S360; otherwise, execution continues with S350 where an error message is added to a report and the execution continues with S360. In S360 it is checked whether an additional single mode SDC file 110 is to be checked and if so execution continues with S320; otherwise, execution continues with S370. In S370 a report is generated which may either be a clean report, i.e., the merged SDC file is found to have properly merged all the constraints of the individual mode SDCs 110, or otherwise errors are reported denoting the specific SDC files 110 that have been found not to be properly covered by the merged SDC file 130. It would be appreciated by those of ordinary skill in the art that while the nature of a flowchart description seems to denote serial processing it is possible to fully or partially have parallel processing without departing from the spirit of the present disclosure.

As noted above the merged SDC 130 contains the most pessimistic constraints, hence, if constraints set in different modes are not the same, the one that is the most pessimistic is selected for the merged SDC 130, so that it does not under constraint the path any more than the individual modes. In the case where constraints are conflicting they may not be included in the merged SDC 130.

Next, several scenarios for merging SDCs in accordance with the principles of the present disclosure are discussed. The commands are known in the art as part of the SDC definitions, however it should be understood that these are given merely as examples and should not be viewed as limiting the scope of the present disclosure. With respect to same or similar and different clocks the following applies. Clocks are considered the same or similar if their respective periods are close within some predefined tolerance, they have the same unateness, positive or negative edge triggered, applied on the same object, or applied on an equivalent object driving the same set of flip-flops (FFs). Clocks that are determined to be the same or similar can be merged into a single clock and the period which is smallest is selected for the merged clock. Clocks which are not determined to be the same or similar are considered to be different clocks. If the different clocks drive the same or equivalent object, then both clocks are to be created in the merged SDC 130 and they should be set in a group such that they are logically exclusive, using, for example, the term:

set_clock_group—logically_exclusive

Figure 4:
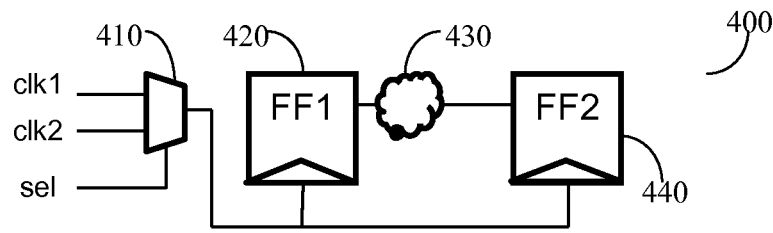

Reference is now made to FIG. 4 that depicts a first exemplary and non-limiting block diagram 400 of clocks clk1 and clk2 converging on a multiplexer 410. The multiplexed clock at the output of multiplexer 410 drives two FFs, 420 and 440, where the output of FF 420 is the input to combinational logic 430 the output of which is input to the FF 440. There are several possible cases that can be considered. In case A, assuming clk1 and clk2 are defined in all operational modes, mode 1 can have the sel signal value set/propagated to '0' while in mode 2 the sel signal is set/propagated to '1'. In case A the merged mode SDC will have the clk1 definition from mode 1 and clk2 definition from mode 2. The command set_case_analysis on sel is to be dropped from the merged SDC file and the new command set_clock_group—logically_exclusive between clk1 and clk2 is to be added to the merged SDC file. More specifically, the SDC for Mode 1 and Mode 2 as well as the merged SDC file for this case are as follows:

SDC Mode 1:
    create_clock—name clk1—period 10 [get_ports CLK1]
    set_case_analysis 0 inst_mux/sel SDC Mode 2:
    set_case_analysis 1 inst_mux/sel Merged SDC File:
    create_clock—name clk1—period 10 [get_ports CLK1]
    create_clock—name clk2—period 11 [get_ports CLK2]
    set_clock_group—logically_exclusive between—group clk1—group clk2

A real-world analogy of case A is provided next. Suppose that a device has a camera and an mp3 player which require different clocks but can only work one at a time. That is, a clock will be supplied to only one of the camera and mp3 player at any given time. The design team in charge of the camera will provide the constraints for the camera clock, say clk1. The design team in charge of the mp3 player will provide the constraints for the mp3 clock, say clk2. Each of the design teams will provide an SDC file for the element they were in charge of.

For the final device, the SDC files for the camera and the mp3 must be merged. The set_case_analysis on sel command will be present in each of the two SDC files. If we simply merge the two SDC files, that would create set_case_analysis on sel for each of the clocks, clk1 and clk2 but would not capture the actual implementation, which is that clk1 and clk2 form a logically exclusive group and are selectively output. The command set_clock_group—logically_exclusive covers this actual implementation and is the more pessimistic constraint compared to set_case_analysis on sel.

In case B, again assuming that clk1 and clk2 are defined in all mode, mode 1 and mode 2 may have the sel signal set/propagated to '0'. In the merged mode SDC for case B it is necessary to resolve the clk1 definition for same/similar/different clocks as explained herein above. The clk2 is either dropped or its definition is resolved for same/similar/different clocks as explained hereinabove. The following commands may then be set in the merged SDC file:

set_case_analysis on set/propagated to '0'

If clk2 is being defined then the following command should be included in the merged SDC file:

Set_clock_group—logically_exclusive between clk1 and clk2

A further case applicable to the circuit shown in FIG. 4 is case C where it is assumed that clk1 and clk2 are defined in all mode, but the command set_case_analysis is not defined in either mode of operation. In this case it is necessary to resolve the clk1/clk2 definition for same/similar/different clocks as discussed hereinabove. In the merged SDC file the following is entered:

set_clock_group—logically_execlusive between resolved clk1 and resolved clk2

Yet another possible case for the circuit 400 described in FIG. 4 still assumes that clk1 and clk2 are defined in all mode, but that the command set_case_analysis is defined for only one of the operational modes, for example mode 1 is defined as sel set/propagated to '0'. In the merged SDC file the definition for clk1 is used and the definition for clk2 is resolved for same/similar/different clocks as discussed hereinabove. The command:

set_case_analysis on sel is dropped from the merged SDC file and the command:

set_clock_group—logically_exclusive between clk1 and resolved clk2 is to be added to the merged SDC file.

Figure 5:
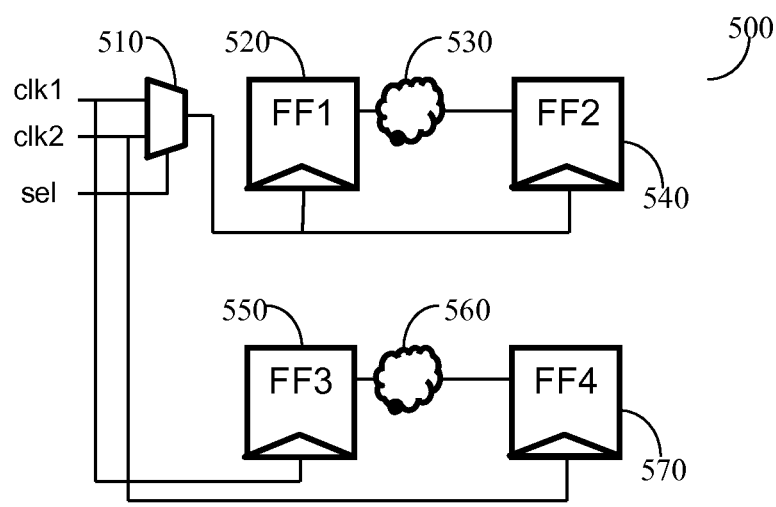

FIG. 5 depicts a second exemplary and non-limiting block diagram 500 of clocks converging on a multiplexer 510. The multiplexed clocks clk1 and clk2 drive FFs 520 and 540. The output of FF 520 is connected to a combinational logic 530, the output of which is connected to the input of FF 540. The clock clk1 drives the FF 550 and the clock clk2 drives FF 570. The output of FF 550 is connected to a combinational logic 560, the output of which is connected to the input of FF 570. The circuit 500 can be handled similarly to the circuit 400 described with respect of FIG. 4 where two original SDC Mode 1 and Mode 2 are merged into a a merged SDC file as described below:

SDC Mode 1:
create_clock—name clk1—period 10 [get_ports CLK1]
set_case_analysis 0 inst_mux/sel
SDC Mode 2:
set_case_analysis 1 inst_mux/sel
Merged SDC File:
create_clock—name clk1—period 10 [get_ports CLK1]
create_clock—name clk2—period 11 [get_ports CLK2]
create_generated (gclk1) at output of mux (-combinational, divide_by_1) wrt clk1
create_generated (gclk2) at output of mux (-combinational, divide_by_1) wrt clk2
set_clock_group—logically_exclusive between gclk1 to gclk2

In this case an over-constraint is actually preferred over the most pessimistic one as it handles all the design cases. It will be pessimistic only when it has to choose between constraints applied at the same points. For example, this could be with a clock having a period of 10 and a period of 11 and picking a period of 10. The difference between these teachings and the teachings respective of FIG. 4 is that in that earlier case it is not necessary to generate an additional clock, since clk1 and clk2 do not interact at all, while in the case shown with respect of FIG. 5 this does happen because of FFs 550 and 570.

Figure 6:
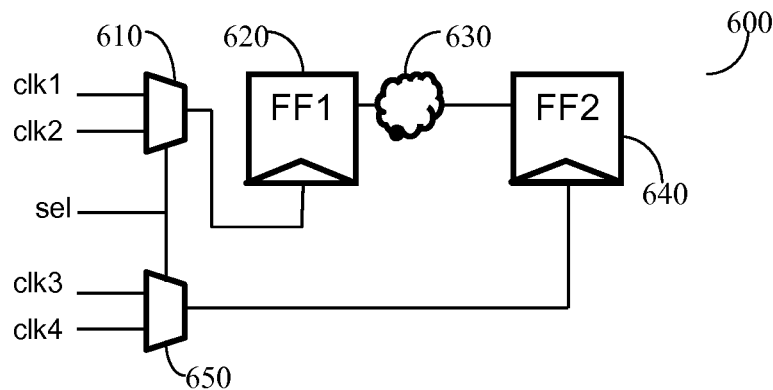

FIG. 6 depicts a third exemplary and non-limiting block diagram 600 of clocks converging on multiplexers 610 and 650. The clocks clk1 and clk2 converge in multiplexer 610 and drive FF 620. The clocks clk3 and clk4 converge in multiplexer 650 and drive FF 640. Both multiplexers 610 and 650 are controlled by a single select signal sel. The output of FF 620 is connected to combinational logic 630, the output of which is connected to the input of FF 640. In case E it is assumed that the clocks are defined in all modes and that in mode 1 sel is set to '0' while in mode 2 sel is set to '1'. In the merged SDC file clk1 and clk2 are used from mode 1 and clk2 and clk4 are used from mode 2. In addition the command:
set_case_analysis
is dropped from the merged SDC file and the command:
set_clock_group—logically_exclusive between {clk2, clk4} and {clk1, clk3}
is added to the merged SDC file. In case F, assuming that the clocks are defined in all modes and that in mode 1 and mode 2 sel is set to '0', then in the merged SDC file it is necessary to resolve the clocks clk1, clk2, clk3 and clk4 as explained hereinabove. In addition the command:
set_case_analysis on sel to '0'
is added to the merged SDC file. In yet another case, case G, it is assumed the the clocks are defined in all modes, however no set_case_analysis is defined. In such a case it is necessary to resolve the clocks clk1, clk2, clk3 and clk4 as explained hereinabove for the merged SDC file. In addition the command.
set_clock_group—logically_exclusive between clk1 and clk4
set_clock_group—logically_exclusive between clk2 and clk3
are to be added to the merged SDC file.

It should be noted that generated clocks are either the same or similar to the clocks that have generated them when they are set on the same object or are set on equivalent objects driving the same set of FFs, or if they have the same divide_by or multiply_by factor. In the process of merging described herein, generated clocks are treated similar to original clocks of the circuit. In a merged SDC when generating a set_clock_group between the different master clocks the generated clock is to be included in the same set_clock_group. For example, if in mode 1 there are clk1 and gclk1 and in mode 2 there are clk1' and gclk1' then in the merged mode of the merged SDC the following command should be used:
set_clock_group—group {Clk1, GClk1}—group {Clk1', GClk1'}

In accordance with the principles of the present disclosure it may also be necessary to handle the merge of set_case_analysis commands. According to the present disclosure if values are the same in all modes of operation that the set_case_analysis is retained in the merged SDC file. However, if values conflict then the conflicts are to be flagged and dropped from the merged SDC file. It should be noted that equivalent objects are those which have the same impact when case_analysis is applied. If a set_case_analysis is missing from at least one mode then, for paths which are disabled in one mode it is checked if the path is disabled in another mode too, e.g., due to some other set_case_analysis. If the path is not disabled in another mode then the set_case_analysis of one mode can be dropped. If the path is disabled then the set_case_analysis is to be retained. If some paths are disabled then the set_case_analysis is to be dropped from the merged SDC file and the command:
Set_disable_timing
is to be added to the respective segments.

Merging of exceptions is another aspect of the process of merging single mode SDC files into a merged SDC file. In the case of clock-to-clock false paths, i.e., a timing exception set between two FFs driven by two clocks, which may be synchronous or asynchronous, all such paths should be retained in the merged SDC file as is with any appropriate clock name modification on account of merging. False paths may also be present in non-clock to non-clock path, clock to non-clock path and non-clock to clock path. A non-clock can be between port/pin to register, register to port/pin, port/pin to port/pin or register to register. In Case H a false path is defined in operation mode 1 and is missing in mode 2. In this case the false path is to be dropped from the merged SDC file. In case I there is a false path in mode 1 and a multi-cycle path (MCP) in mode 2. In this case the MCP is the one to be retained in the merged SDC file. In case J there is a false path in mode M1 and set_max_delay/set_min_delay in mode 2. In this case the set_max_delay/set_min_delay is to be retained in the merged SDC file. There are also several cases involving MCPs. In case K a MCP is defined in mode 1 and missing in mode 2. In this case the MCP is dropped from the merged SDC file. In case L, the MCP is present in both mode 1 and mode 2 but with a different multiplier. In this case the MCP is retained in the merged SDC file using the lower multiplication value. In case M mode 1 is a MCP and there is a set_max_delay/set_min_delay in mode 2. In this case the more pessimistic constraint is to be retained.

Merging of input/output (IO) delays is also considered as part of the merging into the merged SDC file. Initially the clocks must be resolved as explained hereinabove and these are used for the IO clocks. In case N there is a set_input_delay (SID) or set_output_delay (SOD) in mode 1 which is missing in mode 2. In this case the SID/SOD is retained in the merged SDC file and applied with regards to the resolved clock. In case O SID/SOD exists in mode 1 and mode 2, with different values but the same clock. In this case the SID/SOD with the larger value with regards to the resolved clock is retained in the merged SDC file. However, when specified with the -min option then the lesser value with regards to the resolved clock is used in the merged SDC. In case P SID/SOD exists in mode 1 and mode 2 however each having a different clock. In this case both SID/SOD are retained and the option -add_delay is used in the merged SDC file if both blocks are retained in the merged mode.

The principles of the present disclosure are implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal.

All examples and conditional language recited herein are intended for pedagogical purposes to aid the reader in understanding the principles of the present disclosure and the concepts contributed by the inventor to furthering the art, and are to be construed as being without limitation to such specifically recited examples and conditions. Moreover, all statements herein reciting principles, aspects, and embodiments of the present disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for merging a plurality of design constraints files of a design of an integrated circuit (IC) designed using a computer aided design (CAD) system, the CAD system including at least a processor and a memory, the method comprising:
   receiving the plurality of design constraints files from the memory of the CAD system;
   merging the plurality of design constraints files into a merged design constraints file based on at least a merging rule such that the merged design constraints file contains at least one of a pessimistic constraints set for the IC or over-constraints set for the IC; and
   storing the merged design constraints file in the memory of the CAD system,
   wherein the design of the IC can be verified using the merged design constraints file instead of the plurality of design constraints files.

2. The method of claim 1, wherein the pessimistic constraints are set so that a given path of the IC is not under constrained in the merged design constraints file any more than the given path is constrained by any one of the constraints in any one of the plurality of design constraints files.

3. The method of claim 1, further comprising:
   verifying that the constraints of each of the plurality of design constraints files are covered by the merged design constraints file.

4. The method of claim 3, further comprising:
   providing an alert to the CAD system for each of the plurality of design constraints files in response to determining that a constraint included in the plurality of design constraints files is not covered by the merged design constraints file.

5. The method of claim 1, further comprising:
   providing an indication to the CAD system, the indication being at least one of: constraints that were merged in the merged design constraints file, constraints that have been dropped from the merged design constraints file, constraints that have conflicts and therefore cannot be merged.

6. The method of claim 1, further comprising:
   determining whether clocks of the IC are the same, similar or different.

7. The method of claim 6, wherein clocks are determined to be the same or similar if at least one of the following occurs: period of the clocks is close, same positive or negative edge trigger, applied to same object, applied on an equivalent object driving same set of flip-flops.

8. The method of claim 7, further comprising:
   merging same or similar clocks into the merged design constraints file with a period which is smallest.

9. The method of claim 6, wherein each of the clocks determined to be different and which are driving same objects or equivalent objects are created in the merged constraints file.

10. The method of claim 9, further comprising:
    setting a logically exclusive clock group between the clocks determined to be different.

11. A non-transitory computer readable medium having stored thereon instructions for causing one or more processing units to execute a method for merging a plurality of design constraints files of a design of an integrated circuit (IC) designed using a computer aided design (CAD) system, the instructions comprising:
    first instructions for receiving the plurality of design constraints files from a memory of the CAD system;
    second instructions for merging the plurality of design constraints files into a merged design constraints file based on at least a merging rule such that the merged design constraints file contains a pessimistic constraints set or over-constraints set for the IC; and
    third instructions for storing the merged design constraints file in the memory of the CAD system,
    wherein the design of the IC can be verified using the merged design constraints file instead of the plurality of design constraints files.

12. A computer aided design (CAD) system for the design of an integrated circuit (IC) comprising:
    a memory in which a plurality of design constraints files of the IC are stored; and
    a central processing unit (CPU) which executes instructions for merging the plurality of design constraints files of the IC, based on at least a merging rule, into a merged constraints file, the merged filed including a pessimistic constraints set or over-constraints set for the IC, wherein design of the IC can be verified using the merged design constraints file instead of the plurality of design constraints files.

13. The CAD system of claim 12, wherein the pessimistic constraints are set so that a given path of the IC is not under constrained in the merged design constraints file any more than the given path is constrained by any one of the constraints in any one of the plurality of design constraints files.

14. The CAD system of claim 12, wherein the CPU verifies that the constraints of each of the plurality of design constraints files are covered by the merged design constraints file.

15. The CAD system of claim 14, wherein the CPU generates an alert to the CAD system for each of the plurality of design constraints files in response to a determination that a constraint included in the plurality of design constraints files is not covered by the merged design constraints file.

16. The CAD system of claim 14, wherein the CPU provides an indication to the CAD system, the indication being at least one of: constraints that were merged in the merged design constraints file, constraints that have been dropped from the merged design constraints file, constraints that have conflicts and therefore cannot be merged.

17. The CAD system of claim 14, wherein the CPU determines whether clocks of the IC are the same, similar or different.

18. The CAD system of claim 17, wherein the CPU determines clocks to be the same or similar if at least one of the following occurs: period of the clocks is close, same positive or negative edge trigger, applied to same object, applied on an equivalent object driving same set of flip-flops.

19. The CAD system of claim 18, wherein the CPU merges same or similar clocks into the merged design constraints file with a period which is smallest.

20. The CAD system of claim 17, wherein the CPU creates each of the clocks in the merged constraints file that are determined to be different and that are driving same objects or equivalent objects.

21. The CAD system of claim 20, wherein the CPU sets a logically exclusive clock group between the clocks determined to be different.

* * * * *